United States Patent [19]

Ray

[11] Patent Number: 4,516,214

[45] Date of Patent: May 7, 1985

[54] POWER FAILURE ALARM CIRCUIT PERMITTING ORDERLY SHUTDOWN OF MICROPROCESSOR LOAD

[75] Inventor: Richard C. Ray, Randolph Township, Morris County, N.J.

[73] Assignee: AT&T Bell Laboratories, Murray Hill, N.J.

[21] Appl. No.: 441,108

[22] Filed: Nov. 12, 1982

[51] Int. Cl.³ ............................................. G06F 15/56
[52] U.S. Cl. .................................... 364/483; 364/492; 364/200
[58] Field of Search ............... 364/483, 492; 365/228; 340/636

[56] References Cited

U.S. PATENT DOCUMENTS

| 3,937,937 | 2/1976 | McVey | 364/200 X |
| 4,096,560 | 6/1978 | Footh | 364/200 |
| 4,234,920 | 11/1980 | Van Ness et al. | 364/200 |
| 4,307,455 | 12/1981 | Juhasz et al. | 364/900 |
| 4,375,663 | 3/1983 | Arcara et al. | 364/200 |

Primary Examiner—Edward J. Wise
Attorney, Agent, or Firm—Alfred G. Steinmetz

[57] ABSTRACT

A power failure detector for an off-line switcher provides an indication of power failure to a microprocessor load to permit an orderly shutdown without loss of data. The failure detector includes a voltage storage device shunting a secondary winding of a converter power transformer prior to the isolating diode. When its voltage drops below a preset threshold, the microprocessor load is notified that a shutdown action is to be taken.

6 Claims, 1 Drawing Figure

POWER FAILURE ALARM CIRCUIT PERMITTING ORDERLY SHUTDOWN OF MICROPROCESSOR LOAD

TECHNICAL FIELD

This invention relates to alarm circuits and, more particularly, to an alarm circuit for notifying a microprocessor load that power is about to fail so that an orderly shutdown is permitted without loss of data.

BACKGROUND OF THE INVENTION

In order to prevent loss of data, a microprocessor or data processor type load must be notified in advance of an impending power failure so that an orderly shutdown procedure can be implemented and data transferred to permanent storage so that the microprocessor may resume its tasks after power is reapplied.

In conventional line powered power supplies or off-line switchers, loss of AC line power is sensed at the AC line outlet, and a power fail signal is generated. Since the input and output circuits of the typical off-line switchers are DC voltage isolated normally by a power transformer, the same DC voltage isolation must be maintained in the alarm circuit between the AC voltage sensor and the microprocessor load. This requires the addition of a signal transformer or opto-isolator coupled to the alarm circuit.

SUMMARY OF THE INVENTION

An alarm circuit in accord with the principles of the invention is applied to the secondary side of a flyback type off-line switcher to provide a fail signal to a microprocessor load to permit time for an orderly shutdown procedure.

A capacitor shunting the power transformer secondary prior to the isolating or flyback diode stores a replica of the input voltage applied to the power transformer when the power switch is conducting. This voltage is sampled and compared with a reference voltage. When the sampled voltage drops below the reference voltage, the microprocessor load is notified that a power failure is about to occur.

BRIEF DESCRIPTION OF THE DRAWING

An understanding of this invention may be ascertained by reference to the following specification and the accompanying drawing in which:

The sole FIGURE is a schematic of an off-line switcher including a power failure alarm circuit embodying the principles of the invention.

DETAILED DESCRIPTION

Figure 1:
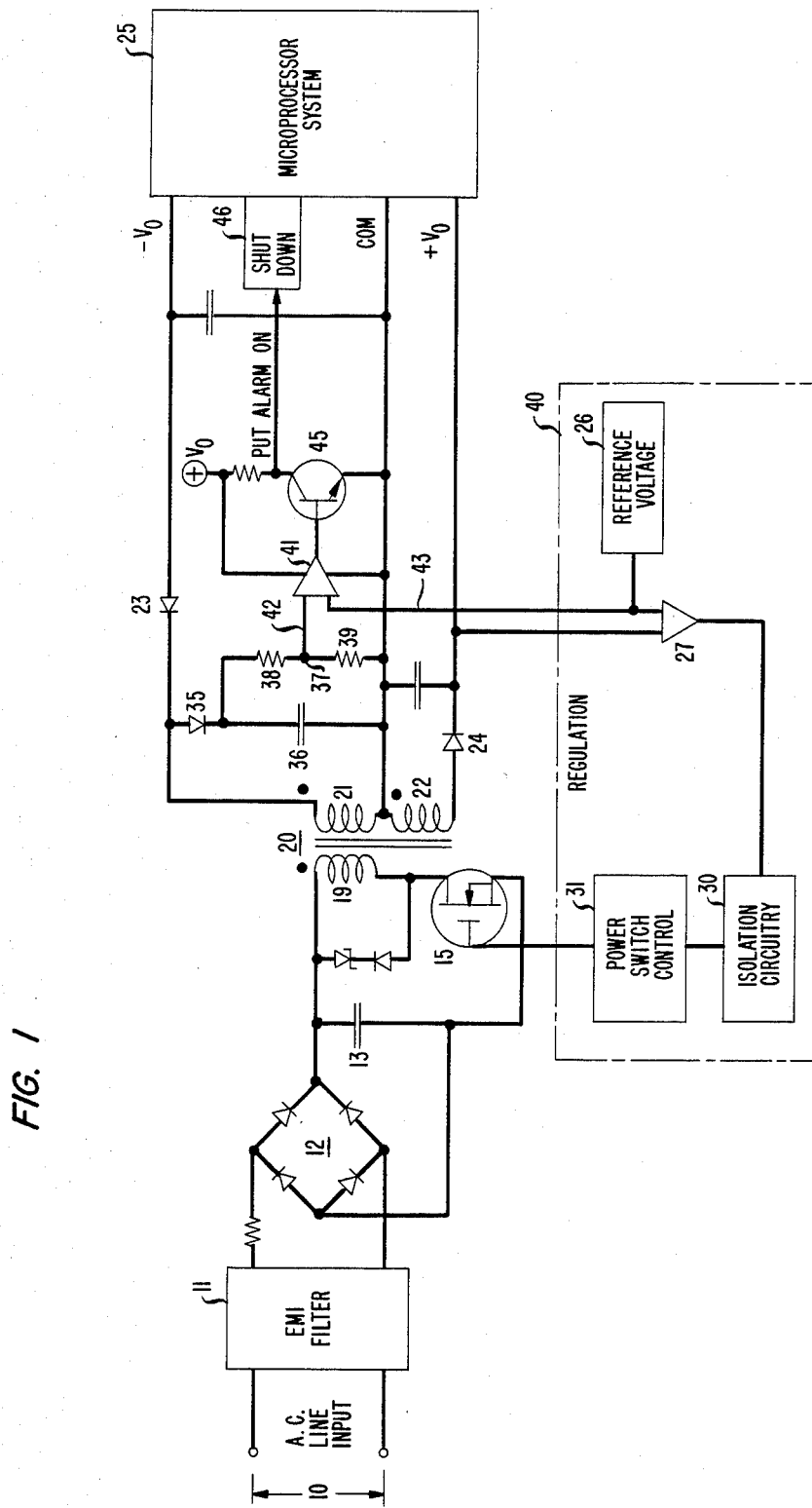

This off-line switcher operating in a flyback mode as shown in the FIGURE is designed to accept AC power from an AC line 10 and couple it through an EMI filter 11 to a fullwave rectifier 12 with the rectified AC voltage being stored on a capacitor 13. A power FET transistor 15 couples the DC voltage of the capacitor 13 to the primary winding 19 of the power transformer 20. A tapped secondary winding comprising winding segments 21 and 22 is coupled through the isolating or flyback diodes 23 and 24 to a microprocessor system or load 25 to be powered. The microprocessor load 25 may comprise a microcomputer, a data processing arrangement or any other system requiring an orderly shutdown to preserve data. The microprocessor includes a subcircuit or system shutdown arrangement or circuit 46 to control and initiate this orderly shutdown.

The output voltage at the load 25 is sensed and compared with a reference voltage supplied by a stable voltage source 26 by the error amplifier 27 which comprise a part of the feedback regulation circuitry 40. The resulting error signal is coupled through an isolation circuit 30 which may comprise a transformer or opto-coupler to the power switch drive circuit 31 which varies the duty cycle of the power switch 15.

A power failure detector circuit is shunted directly across the segment 21 of the secondary winding of the power transformer and located prior to the isolating or flyback diode 23. A diode 35 and capacitor 36 shunt the secondary winding segment 21, and a voltage divider comprising resistors 38 and 39 shunts the capacitor 36.

An input lead 42 of the comparator 41 is coupled to the node 37 of the voltage divider. The other input lead 43 is coupled to the reference voltage source 26 of the regulation circuitry 40. The output of the comparator 41 is coupled to the control electrode of a transistor switch 45 and is operative to turn the transistor switch on when the voltage at the node 37 of the voltage divider drops below the reference voltage.

The illustrative converter disclosed herein is designed to provide the desired regulated output voltage even when the input AC voltage is significantly below rated value. Hence, the voltage level on the capacitor 13 is sufficient to provide a significant hold-over time after an AC voltage failure has occurred.

When the power switch 15 is conducting and the isolating diode 23 is back biased, a replica of the input voltage applied to the primary winding 19 occurs across the secondary winding 21 and is stored on the capacitor 36 through the forward-biased diode 35. A proportional representative of this voltage at the voltage node 37 is compared by the comparator 41 to the reference voltage supplied by reference voltage source 26 and also used herein by the basic regulation loop. When the voltage at the node 37 drops below the reference voltage supplied by source 26, the transistor 45 is biased conducting to supply a shutdown alarm signal to a shutdown control circuit 46 which is part of the microprocessor load 25 coupled to the output terminals of the power supply. The shutdown control circuit 46 operates to activate the microprocessor load into an orderly shutdown mode in which its data is preserved. Details of shutdown arrangements to achieve these goals are well-known to those skilled in the art and hence are not disclosed herein in detail. The resistance values of the voltage divider are preselected so that the threshold or reference voltage as compared with the voltage at the node 37 takes advantage of a hold-over voltage capacity of the input filter capacitor 13. The fail signal output of transistor 45 occurs only when the voltage on the capacitor 13 drops below a shutdown level, slightly above the level at which an acceptable regulated output voltage at the microprocessor load 25 can be maintained. Hence AC line power voltage failures of short duration do not generate a fail signal if the line voltage had been substantially above the threshold level necessary to keep the voltage on capacitor 13 at a high enough level so that the voltage at node 37 exceeds the reference voltage. The load is not directly responsive to failures of the AC line voltage. There exists a time interval from the failure of the AC voltage to the time when the DC voltage on capacitor 13 becomes insufficient to maintain the regulated output voltage. The failure alarm signal is generated at a predetermined threshold voltage level when the voltage on capacitor 13 is just sufficient to maintain the regulated output voltage for a specified hold-over time.

It is readily apparent that the AC power failure alarm circuit is simple, inexpensive and possesses many advantages. For example, it is on the secondary of the power transformer, and hence does not require an independent isolation means to isolate it from the primary side of the power transformer. It also utilizes the same voltage reference as the regulation circuit and in the use of multiple OP AMP chips, utilizes an extra OP AMP on the chip used to provide the regulation circuit comparator that would normally remain unused.

Many variations of this invention will be apparent to those skilled in the art which do not depart from the spirit and scope of the invention. For example, while a flyback converter has been disclosed as an example, it is readily apparent to those skilled in the art that the principles of the invention may be applied to forward type converters. In this particular instance, the power failure detector circuit is shunted across the secondary winding of the power transformer in advance of the isolating diode providing the rectifying function.

What is claimed is:

1. A converter adapted to be energized from an AC line and including an alarm circuit for notifying a shutdown control of a microprocessor load that AC line power is about to fail comprising:
   means for storing a replica of voltage of a primary side of the converter on the secondary side including capacitive storage means in a circuit shunting a secondary winding of a power transformer of the converter,
   a comparator for comparing a voltage stored in the capacitive storage means with a reference voltage,
   an input filter capacitor operative for providing hold over voltage capacity
   means, responsive to the comparator, for generating an alarm signal, the alarm circuit being operative for generating an alarm signal indicating impending failure of the AC line power when voltage on the input filter capacitor drops to a level at which a predetermined output regulated voltage cannot be maintained beyond a predetermined time,
   means for coupling the alarm signal to the shutdown control, comprising a transistor switch coupled to gate a DC energizing voltage to the shutdown control of the microprocessor load, and
   voltage regulation circuitry including an error voltage amplifier wherein the comparator and the error voltage amplifier utilize a common reference voltage.

2. A flyback converter for operating from off-line AC power including a power transformer having primary and secondary windings, a power switch and an isolating diode comprising:
   an alarm circuit for notifying a shutdown component of a microprocessor load powered by the flyback converter that AC line power is about to fail including:
   a circuit for deriving a replica of a primary winding voltage being shunted across the secondary winding prior to the isolating diode and including a steering diode and a voltage storage capacitor,
   a voltage divider shunting the voltage storage capacitor,
   comparator means coupled for accepting an input voltage from a node of the voltage divider that is a representation of a voltage on the voltage storage capacitor and the comparator operative for comparing the input voltage from a node of the voltage divider with a reference voltage,
   means, responsive to the comparator means, for generating an alarm signal including a transistor switch coupled to gate a DC energizing voltage to the shutdown component of the microprocessor load, and p1 a voltage regulation feedback controller having error voltage amplifier means wherein the comparator means and the error voltage amplifier means utilize the same reference voltage.

3. A converter as defined in claim 2 wherein the comparator means and the error voltage amplifier means comprise operational amplifiers located in a common integrated circuit chip.

4. A flyback converter for operating from off-line AC power comprising:
   input means for accepting power from an AC line and including a rectifier and an input filter capacitor,
   a power transformer including a primary winding and a secondary winding,
   a power switch interconnecting the input means and the primary winding,
   output means for accepting a microprocessor load to be energized
   a flyback diode interconnecting the secondary winding to the output means, the flyback diode having its forward conduction direction oriented to conduct current from the secondary winding when the power switch is nonconducting
   an alarm circuit for notifying a shutdown input of the microprocessor load energized by the flyback converter that AC line power is about to fail including:
   a second diode and a replica voltage storage capacitor connected in a series connection with the series connection connected in parallel with at least a portion of the secondary winding, the second diode having its forward conduction direction oriented to conduct current from the secondary winding when the power switch is conducting, and a discharge path for the replica voltage capacitor,
   a comparator with a reference signal input and a second input to accept a voltage supplied by the replica voltage storage capacitor, and
   a switch responsive to an output of the comparator for applying a shutdown signal to a microprocessor load connected to the output means.

5. A flyback converter as defined in claim 4 wherein: the switch responsive to an output of the comparator comprises a transistor switch coupled to gate a DC energizing voltage to a shutdown control of the microprocessor load.

6. A converter as defined in claim 4 wherein the discharge path comprises a voltage divider shunting the replica voltage storage capacitor, and the comparator is coupled accepting an input voltage from a node of the voltage divider.

* * * * *